United States Patent
Czaplewski et al.

(10) Patent No.: US 9,920,170 B1
(45) Date of Patent: Mar. 20, 2018

(54) BIO-DERIVED CROSS-LINKERS

(71) Applicant: International Business Machines Corporation, Armonk, NY (US)

(72) Inventors: Sarah K. Czaplewski, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/410,025

(22) Filed: Jan. 19, 2017

(51) Int. Cl.
*C08G 77/38* (2006.01)
*C08G 77/392* (2006.01)

(52) U.S. Cl.
CPC .......... *C08G 77/38* (2013.01); *C08G 77/392* (2013.01)

(58) Field of Classification Search
None
See application file for complete search history.

(56) References Cited

U.S. PATENT DOCUMENTS

| | | |
|---|---|---|
| 2,587,295 A | 2/1952 | Doyle et al. |
| 2,717,900 A | 9/1955 | Plueddemann et al. |
| 3,206,415 A | 9/1965 | Horst et al. |
| 4,045,602 A | 8/1977 | Sommer et al. |
| 4,301,268 A | 11/1981 | Kropac |
| 4,474,933 A | 10/1984 | Huber et al. |
| 4,781,973 A | 11/1988 | Zotto |
| 4,895,830 A | 1/1990 | Takeda et al. |
| 5,861,467 A | 1/1999 | Bujanowski et al. |
| 6,203,923 B1 | 3/2001 | Bansleben et al. |
| 6,239,204 B1* | 5/2001 | Miura .................. C08G 65/14 252/62.2 |
| 6,572,882 B1 | 6/2003 | Vercauteren et al. |
| 6,605,691 B1* | 8/2003 | Gross ................. C08G 75/045 525/204 |
| 6,809,231 B2 | 10/2004 | Edwards |
| 7,670,686 B2 | 3/2010 | Chen et al. |
| 2003/0149124 A1* | 8/2003 | Thommes .............. C08G 59/18 522/75 |
| 2011/0217750 A1 | 9/2011 | Pandit et al. |
| 2012/0184682 A1 | 7/2012 | Dasgupta |
| 2012/0220749 A1 | 8/2012 | Dasgupta |
| 2012/0295353 A1 | 11/2012 | Hong et al. |

(Continued)

FOREIGN PATENT DOCUMENTS

| | | |
|---|---|---|
| CN | 105287320 A | 2/2016 |
| CN | 105473126 A | 4/2016 |
| WO | WO-2005/052019 A1 | 6/2005 |

OTHER PUBLICATIONS

Haimov, "Preparation, Characterization and Catalysis by Polyoxometalate-Synthetic Protein and Polyoxometalate-Protein Hybrid Assemblies", Thesis, Sep. 2007, 93 pages, Weizmann Institute of Science, Rehovot, Israel, URL: https://lib-phds1.weizmann.ac.il/Dissertations/Haimov_Adina.pdf.

(Continued)

*Primary Examiner* — Robert S Loewe
(74) *Attorney, Agent, or Firm* — Roy R. Salvagio; Robert R. Williams; Kennedy Lenart Spraggins LLP (57) ABSTRACT

A process includes utilizing biorenewable cis-3-hexenol to form a bio-derived cross-linker and utilizing the bio-derived cross-linker to form a cross-linked polymeric material.

20 Claims, 11 Drawing Sheets

(56) References Cited

U.S. PATENT DOCUMENTS

| | | | |
|---|---|---|---|
| 2013/0272755 A1* | 10/2013 | Takeuchi | C09D 175/04 399/286 |
| 2014/0004251 A1 | 1/2014 | Pandit et al. | |
| 2014/0037772 A1 | 2/2014 | Lien | |
| 2014/0107350 A1* | 4/2014 | Nakamura | C07D 331/02 549/1 |
| 2014/0296425 A1 | 10/2014 | Tew et al. | |
| 2014/0329958 A1 | 11/2014 | Lester et al. | |
| 2014/0355173 A1 | 12/2014 | Odle et al. | |
| 2015/0005247 A1 | 1/2015 | Chen et al. | |
| 2015/0179357 A1* | 6/2015 | Ichinomiya | C09D 201/025 429/217 |
| 2016/0032043 A1 | 2/2016 | von Recum | |
| 2016/0194574 A1* | 7/2016 | Gross | C08G 81/00 508/138 |
| 2016/0284905 A1* | 9/2016 | Mitobe | C08G 18/4829 |
| 2017/0121469 A1 | 5/2017 | Kobilka et al. | |

OTHER PUBLICATIONS

Kim et al., Fabrication of PDMS Microlenses With Various Curvatures Using a Water-Based Molding Method, Twelfth International Conference on Miniaturized Systems for Chemistry and Life Sciences, Oct. 2008, pp. 994-996, Royal Society of Chemistry (rsc.org) online, URL: www.rsc.org/binaries/LOC/2008/PDFs/Papers/335_1030.pdf.

Xiameter, "An Overview of Polydimethylsiloxane (PDMS) Fluids in the Environment", Product Information, xiameter.com (online), [accessed Nov. 17, 2016], URL: www.xiameter.com/en/ExploreSilicones/Documents/95-725-01%20Overview%20of%20Polydimethylsiloxane%20Fluids.pdf.

Gelest, "Functional Silicone Reactivity Guide", Product Brochure, Reactive Silicones: Forging New Polymer Links gelest.com (online), [accessed Nov. 17, 2016], p. 2, URL: www.gelest.com/wp-content/uploads/Goods-PDF-brochures-reactivesilicones.pdf.

Innocentive, "Cost-effective, Large-scale Production of Natural Leaf Alcohol (cis-3-hexenol)", Product Challenge No. 9933857, innocentive.com (online), [accessed Nov. 17, 2016], 3 pages, URL: www.innocentive.com/ar/challenge/9933857.

Holladay et al., Biorenewable Processes to Acrylic Acid, Abstract, Pacific Northwest National Laboratory (pnnl.gov) online, [accessed Nov. 17, 2016], 1 page, URL: iic.pnnl.gov/abstracts/nacs/o_109.pdf.

Myriant, "Broad Pipeline, Diverse Applications", Product Pipeline, myrinat.com (online), [accessed Nov. 17, 2016], 1 page, URL: www.myriant.com/products/product-pipeline.cfm.

SGA Polymers, "Bio-Based Acrylic Acid Technology", sgapolymers.com (online), [accessed Nov. 17, 2016], 1 page, URL: www.sgapolymers.com.

Chemical Processing, "Bio-based Route for Allyl Alcohols Beckons: Formic-acid-mediated reaction efficiently converts biomass-derived polyols", chemicalprocessing.com (online), Jul. 2009, 2 pages, URL: www.chemicalprocessing.com/articles/2009/150/.

Sekab, "Chemistry for the Future", sekab.com (online), [accessed Nov. 17, 2016], 1 page, URL: www.sekab.com/chemistry/.

AUS920160641US1, Appendix P; List of IBM Patent or Applications Treated as Related, Jun. 14, 2017, 2 pages.

Lee et al., *Polymer Nanodo-Hybridized Alkyl Silicon Oxide Nanostructures for Organic Memory Transistors with Outstanding High-Temperature Operation Stability*, Scientific Reports, 6:33863, DOI: 10.1038/srep33863, <https://www.ncbi.nlm.nih.gov/pmc/articles/PMC5050446/>, Published Oct. 5, 2016, 10 pages.

Gokmen et al., *Porous polymer particles—A comprehensive guide to synthesis, characterization, functionalization, and applications*, Elsevier, Science Direct, Progress in Polymer Science, vol. 37, Issue 3, < https://webcache.googleusercontent.com/search?q=cache:hbxd4uQY3WAJ:https://pdfs.semanticscholar.org/ed87/e2fd4e12c9c586c31de29d125f3ac5907b72.pdf+&cd=2&hl=en&ct=clnk&gl=us>, Available online Jul. 23, 2011, 41 pages.

Agarwal et al., *Use of electrospinning technique for biomedical application*, Elsevier, Polymer, vol. 49, Issue 26, < http://www.sciencedirect.com/science/article/pii/S0032386108007994>, dated Dec. 8, 2008, 19 pages.

Schwarz et al., *Preparation of molecularly imprinted polymers for the selective recognition of the bioactive polyphenol, (E)-resveratrol*, Elsevier, Journal of Chromatography A, vol. 1218, Issue 16, Available Online Feb. 23, 2011, 7 pages.

Zhang et al., *Study on the preparation of genipin crosslinked chitosan microspheres of resveratrol and in vitro release*, Journal of Polymer Research, (2013) 20:175, Springer Science+Business Media Dordecht 2013, published online Jun. 10, 2013, 10 pages.

Wikipedia, Resveratrol, wikipedia.org (online), accessed Jan. 17, 2017, 18 pages, URL: en.wikipedia.org/wiki/Resveratrol.

Fawcett et al., *Phototunable Cross-Linked Polysiloxanes*, Macromolecules, vol. 48, No. 18, Sep. 2015, pp. 6499-6507, American Chemical Society (ACS) Publications, Washington, DC.

IBM, *IBM Academy of Technology Top 10 Technical Themes 2016*, IBM.com (online), accessed Jan. 16, 2017, 2 pages, URL: http://www-03.ibm.com/ibm/academy/tech/tech.shtml.

Dlamini et al., *Effect of Cross-Linking Agent Chemistry and Coating Conditions on Physical, Chemical, and Separation Properties of PVA-Psf Composite Membranes*, Separation of Science and Technology, vol. 49, Issue 1, Jan. 2014, pp. 22-29, Taylor & Francis Online (tandfonline.com), URL: www.tandfonline.com/doi/full/10.1080/01496395.2013.813040?scroll=top&needAccess=true.

Tang et al., *Whiteness improvement of citric acid crosslinked cotton fabrics: H2O2 bleaching under alkaline condition*, Carbohydrate Polymers, vol. 147, Aug. 2016, pp. 139-145, PubMed.gov (online), National Center for Biotechnology Information, U.S. National Library of Medicine, Bethesda MD.

Zhao et al., *Organic Acids Can Crosslink Poly(ionic liquid)s into Mesoporous Polyelectrolyte Complex*, Electronic Supplementary Material (ESI) for Polymer Chemistry, Issue 4, Feb. 2013, pp. 2432-2435, Royal Society of Chemistry, London, UK.

European Coatings, *Renewable Pentaerythritol to Cut Carbon Footprint*, European-Coatings.com (online), Jun. 15, 2010, 1 pp., URL: www.european-coatings.com/Raw-materials-technologies/Raw-materials/Coatings.

Anonymous, *Cross-Linked Bio-Plasticized Polymer Compositions*, An IP.com Prior Art Database Technical Disclosure, IP.com (online), Oct. 17, 2011, 3 pp., URL: ip.com/IPCOM000211763.

Bender Analytical Holding B.V. et al.; *Cross-Linked Polymers and Implants Derived from Electrophilically Activated Polyoxazoline*, An IP.com Prior Art Database Technical Disclosure, IP.com (online), Mar. 19, 2012, 42 URL: ip.com/IPCOM/000216010.

\* cited by examiner

BIO-DERIVED CROSS-LINKERS

BACKGROUND

Polydimethylsiloxane (PDMS) is among the most widely used silicon-based polymers, and the most widely used organic silicon-based polymer. PDMS materials have a wide range of applications including contact lenses, medical devices, soft lithography processes, shampoos, caulking, and lubricants (among other alternatives). One reason for the wide-ranging applications for PDMS materials is the variety of ways in which the properties of PDMS may be controlled through polymer cross-linking. By employing PDMS and small organic molecules with different organic functional groups, many possibilities exist for different PDMS materials to be cross-linked in different ways.

SUMMARY

According to an embodiment, a process of forming a cross-linked polymeric material is disclosed. The process includes utilizing biorenewable cis-3-hexenol to form a bio-derived cross-linker. The process also includes utilizing the bio-derived cross-linker to form the cross-linked polymeric material.

According to another embodiment, a cross-linked polydimethylsiloxane (PDMS) material is disclosed. The cross-linked PDMS material is formed by a process that comprises chemically reacting a functionalized PDMS material with a bio-derived cross-linker that is derived from biorenewable cis-3-hexenol.

According to another embodiment, a process of forming a bio-derived cross-linker is disclosed. The process includes initiating a first chemical reaction to form hexane-1,3,4-triol from biorenewable cis-3-hexenol. The process also includes initiating a second chemical reaction to form a bio-derived cross-linker from the hexane-1,3,4-triol.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes cross-linkers derived from the biorenewable molecule cis-3-hexenol and methods of forming bio-derived cross-linkers from the biorenewable molecule cis-3-hexenol. The biorenewable molecule cis-3-hexenol, also referred to herein as natural leaf alcohol, may be extracted from plants, where it is formed from enzymatic oxidation of fatty acids (e.g., linoleic acid). In some cases, the biorenewable molecule cis-3-hexenol may be used to form hexane-1,3,4-triol, which may subsequently be utilized as a cross-linking material. In other cases, the bio-derived hexane-1,3,4-triol material may undergo one or more subsequent chemical reactions (e.g., with other biorenewable materials) to form alternative bio-derived cross-linking materials. Utilizing biorenewable natural leaf alcohol (or derivatives thereof) as a cross-linking material may increase the biorenewable content of a cross-linked polymeric material, such as a cross-linked polydimethylsiloxane (PDMS) material, for use in various applications.

The bio-derived cross-linkers of the present disclosure may be applied to PDMS (or other polymers such as PE, PP, PC, PU, acrylics, etc.) for different applications. In some cases, curing may be performed during processing of a desired material, with a completely cross-linked polymer. In other cases, the cross-linkers may be mixed with PDMS, but left in a partial or uncross-linked state that can be left to cross-link upon addition to the PDMS for a particular desired application (e.g., a caulking or coating application, among other alternatives).

Figure 1:
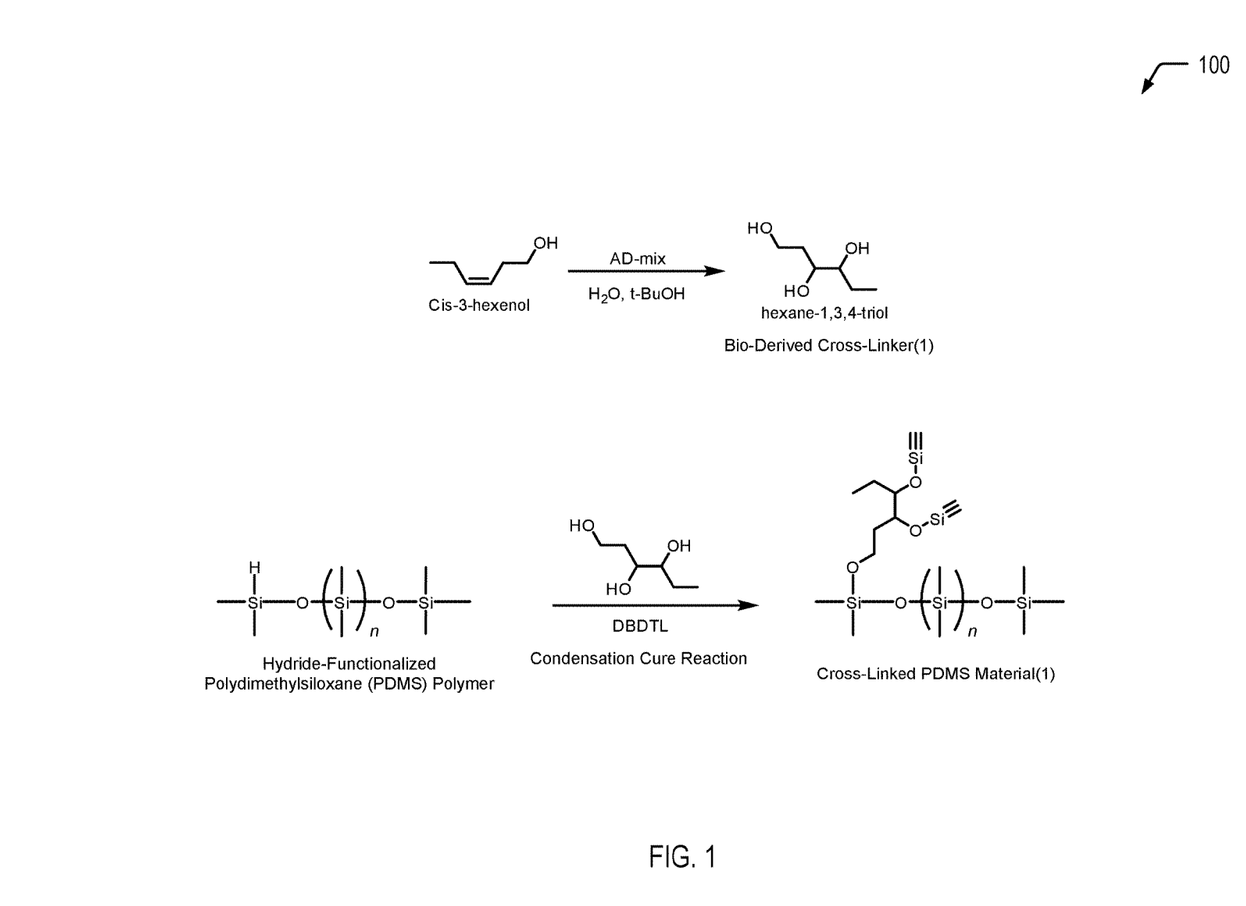
FIG. 1 is a chemical reaction diagram illustrating a process of forming a cross-linked PDMS material using a first bio-derived cross-linking material that is formed from the biorenewable molecule cis-3-hexenol, according to one embodiment.

Referring to FIG. 1, a chemical reaction diagram 100 illustrates a process of forming a bio-derived cross-linker from the biorenewable molecule cis-3-hexenol and utilizing the bio-derived cross-linker to form a cross-linked polymeric material, according to one embodiment. In FIG. 1, cis-3-hexenol (which may be derived from natural leaf alcohol) is converted to hexane-1,3,4-triol, which is then utilized as a first bio-derived cross-linker (designated as "Bio-Derived Cross-Linker(1)" in FIG. 1) for polymeric cross-linking. In the particular embodiment depicted in FIG. 1, the first bio-derived cross-linker is used to form a cross-linked polydimethylsiloxane (PDMS) material (designated as "Cross-Linked PDMS Material(1)" in FIG. 1). The cross-linked PDMS material illustrated in FIG. 1 may be formed via a chemical reaction (e.g., a condensation cure reaction) of the first bio-derived cross-linker and a PDMS polymer.

In the first chemical reaction depicted at the top of FIG. 1, cis-3-hexenol (which may be may be extracted from plants) is converted to hexane-1,3,4-triol via Sharpless Asymmetric Dihydroxylation. As a prophetic example, a reaction vessel may be charged with cis-3-hexenol (1.0 equiv.) and dissolved in a solvent mixture that may be 9:1 acetone/water or tBuOH/water and may be cooled to 0° C. An oxidant such as 4-methylmorpholine-N-oxide or potassium ferricyanide (1.5 equiv.) may be added to reaction mixture, followed by 1 mol % osmium tetroxide. The reaction mixture may be stirred overnight and may be quenched by the addition of a saturated sodium sulfite solution, and extracted with ethyl acetate (3×). The combined organic layers may be washed with brine, dried over magnesium sulfate, filtered, and concentrated in vacuo. The crude mixture may be purified by distillation or chromatography.

The second chemical reaction depicted at the bottom of FIG. 1 illustrates that the hexane-1,3,4-triol material may be utilized as a bio-derived cross-linker to form a cross-linked polymeric material. FIG. 1 illustrates a particular embodiment of a condensation cure reaction that utilizes dibutyltin dilaurate (DBTDL) as a catalyst. FIG. 1 depicts an example in which all three hydroxyl groups of the bio-derived hexane-1,3,4-triol molecule react in the condensation cure reaction. Depending on the reaction conditions, all three hydroxyl groups may be used to cross-link the PDMS polymer or less than three hydroxyl groups may be used for cross-linking. To illustrate, by controlling the reaction conditions, catalyst type (other tin or platinum catalyst may be used), catalyst loading, and stoichiometry, a fraction of the hydroxyl groups (e.g., less than three hydroxyl groups per hexane-1,3,4-triol molecule, on average) can be used for PDMS cross-linking. The ability to control the number of hydroxyl groups that react may enable better control of the mechanical properties of the final polymer.

As a prophetic example, a hydride-functionalized siloxane may be blended with hexane-1,3,4-triol (about 1-20% w/w) and catalyst (DBDTL in this case, 0.1%-2.0% w/w) and mixed. The mixture may be applied to molds or coated onto a substrate and cured for times and temperatures as appropriate for desired applications.

Thus, FIG. 1 illustrates an example of a process of forming a bio-derived cross-linker from the biorenewable molecule cis-3-hexenol and utilizing the bio-derived cross-linker to form a cross-linked polymeric material. The bio-derived cross-linker may be used to increase the biorenewable content of a resulting cross-linked polymeric material (e.g., a cross-linked PDMS material).

Figure 2:
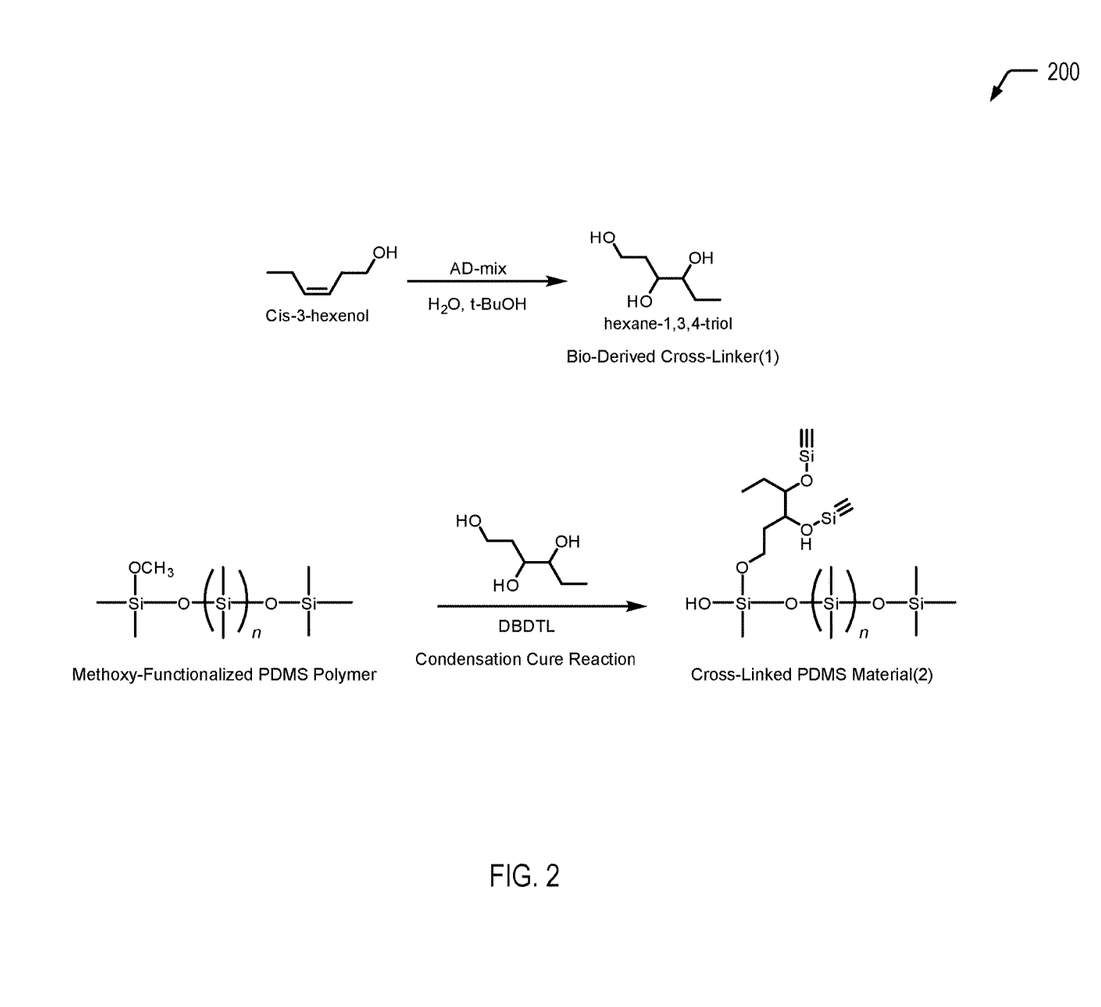
FIG. 2 is a chemical reaction diagram illustrating a process of forming a cross-linked PDMS material using the first bio-derived cross-linking material of FIG. 1, according to one embodiment.

Referring to FIG. 2, a chemical reaction diagram 200 illustrates a process of forming a bio-derived cross-linker from the biorenewable molecule cis-3-hexenol and utilizing the bio-derived cross-linker to form a cross-linked polymeric material, according to one embodiment. The bio-derived cross-linker depicted in FIG. 2 corresponds to the first bio-derived cross-linker depicted in FIG. 1 and may be formed according to the process previously described herein with respect to FIG. 1. In the particular embodiment depicted in FIG. 2, the first bio-derived cross-linker is used to form a cross-linked PDMS material (designated as "Cross-Linked PDMS Material(2)" in FIG. 2). The cross-linked PDMS material illustrated in FIG. 2 may be formed via a chemical reaction (e.g., a condensation cure reaction) of the first bio-derived cross-linker and an alkoxy-functionalized siloxane, such as a methoxy-functionalized siloxane.

The second chemical reaction depicted at the bottom of FIG. 2 illustrates that the hexane-1,3,4-triol material may be utilized as a bio-derived cross-linker to form a cross-linked polymeric material. FIG. 2 illustrates a particular embodiment of a condensation cure reaction that utilizes DBTDL as a catalyst. As a prophetic example, an alkoxy-functionalized siloxane (e.g., a methoxy-functionalized siloxane) may be blended with hexane-1,3,4-triol (about 1-20% w/w) and catalyst (DBDTL in this case, 0.1%-2.0% w/w) and mixed. The mixture may be applied to molds or coated onto a substrate and cured for times and temperatures as appropriate for desired applications.

FIG. 2 depicts an example in which all three hydroxyl groups of the bio-derived hexane-1,3,4-triol molecule react in the condensation cure reaction. Depending on the reaction conditions, all three hydroxyl groups may be used to cross-link the PDMS polymer or less than three hydroxyl groups may be used for cross-linking. To illustrate, by controlling the reaction conditions, catalyst type (other tin or platinum catalyst may be used), catalyst loading, and stoichiometry, a fraction of the hydroxyl groups (e.g., less than three hydroxyl groups per hexane-1,3,4-triol molecule, on average) can be used for PDMS cross-linking. The ability to control the number of hydroxyl groups that react may enable better control of the mechanical properties of the final polymer.

Thus, FIG. 2 illustrates an example of a process of utilizing the bio-derived cross-linker formed from the biorenewable molecule cis-3-hexenol to form a cross-linked polymeric material. The bio-derived cross-linker may be used to increase the biorenewable content of a resulting cross-linked polymeric material (e.g., a cross-linked PDMS material).

FIGS. 3 to 8 illustrate examples of other bio-derived cross-linkers that may be formed from the biorenewable molecule cis-3-hexenol. While FIGS. 3-8 illustrate that the bio-derived cross-linkers may be utilized to form cross-linked PDMS materials, it will be appreciated that the bio-derived materials may be utilized in alternative reactions. For example, FIG. 9 illustrates an example in which a bio-derived cross-linker that includes thiol (or mercapto) groups may form an alternative bio-derived cross-linked polymeric material via an oxidation reaction that results in the formation of disulfide linkages.

Figure 3:
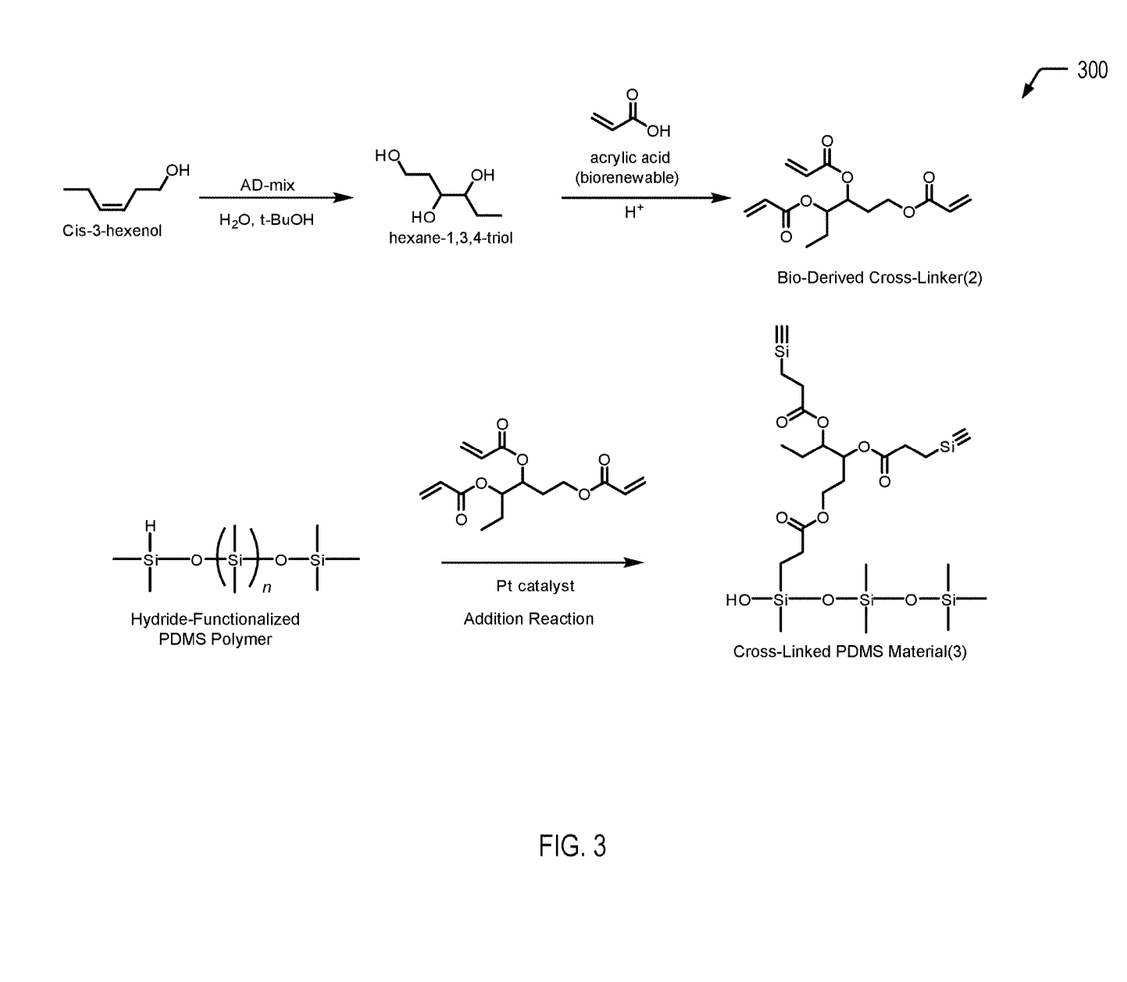
FIG. 3 is a chemical reaction diagram illustrating a process of forming a cross-linked PDMS material using a second bio-derived cross-linking material that is formed from the biorenewable molecule cis-3-hexenol, according to one embodiment.

Referring to FIG. 3, a chemical reaction diagram 300 illustrates a particular embodiment of a process of utilizing the bio-derived hexane-1,3,4-triol molecule to form a second bio-derived cross-linker (identified as "Bio-Derived Cross-Linker(2)" in FIG. 3) that includes multiple vinyl groups. FIG. 3 further illustrates that the second bio-derived cross-linker may be utilized to form a cross-linked polymeric material (e.g., a cross-linked PDMS material), according to one embodiment.

The first chemical reaction depicted at the top of FIG. 3 illustrates that the bio-derived hexane-1,3,4-triol molecule may be reacted with acrylic acid via an acid- (or base-) catalyzed condensation reaction to form a cross-linker with multiple vinyl groups. The acrylic acid may be formed from biorenewable resource(s).

The second chemical reaction depicted at the bottom of FIG. 3 illustrates that the second bio-derived cross-linker may be utilized to form a cross-linked polymeric material. FIG. 3 illustrates a particular embodiment of an addition reaction that utilizes a platinum (Pt) catalyst. As a prophetic example, a hydride-functionalized siloxane may be blended with the second bio-derived cross-linker having multiple vinyl groups (1-20% w/w) and Pt catalyst, such as Speier's catalyst ($H_2PtCl_6$) or Karstedt's catalyst ($C_{24}H_{54}O_3Pt_2Si_6$), and are then mixed. An addition cure reaction via hydrosilation may be performed on the mixture.

FIG. 3 depicts an example in which all three vinyl groups of the second bio-derived cross-linker react in the addition reaction. Depending on the reaction conditions, all three vinyl groups may be used to cross-link the PDMS polymer or less than three vinyl groups may be used for cross-linking. To illustrate, by controlling the reaction conditions, catalyst type (other tin or platinum catalyst may be used), catalyst loading, and stoichiometry, a fraction of the vinyl groups can be used for PDMS cross-linking. The ability to control the number of vinyl groups that react may enable better control of the mechanical properties of the final polymer.

Thus, FIG. 3 illustrates an example of a process of forming a bio-derived cross-linker having multiple vinyl groups from hexane-1,3,4-triol (derived from the biorenewable molecule cis-3-hexenol) and utilizing the bio-derived cross-linker to form a cross-linked polymeric material. The bio-derived cross-linker may be used to increase the biorenewable content of a resulting cross-linked polymeric material (e.g., a cross-linked PDMS material).

Figure 4:
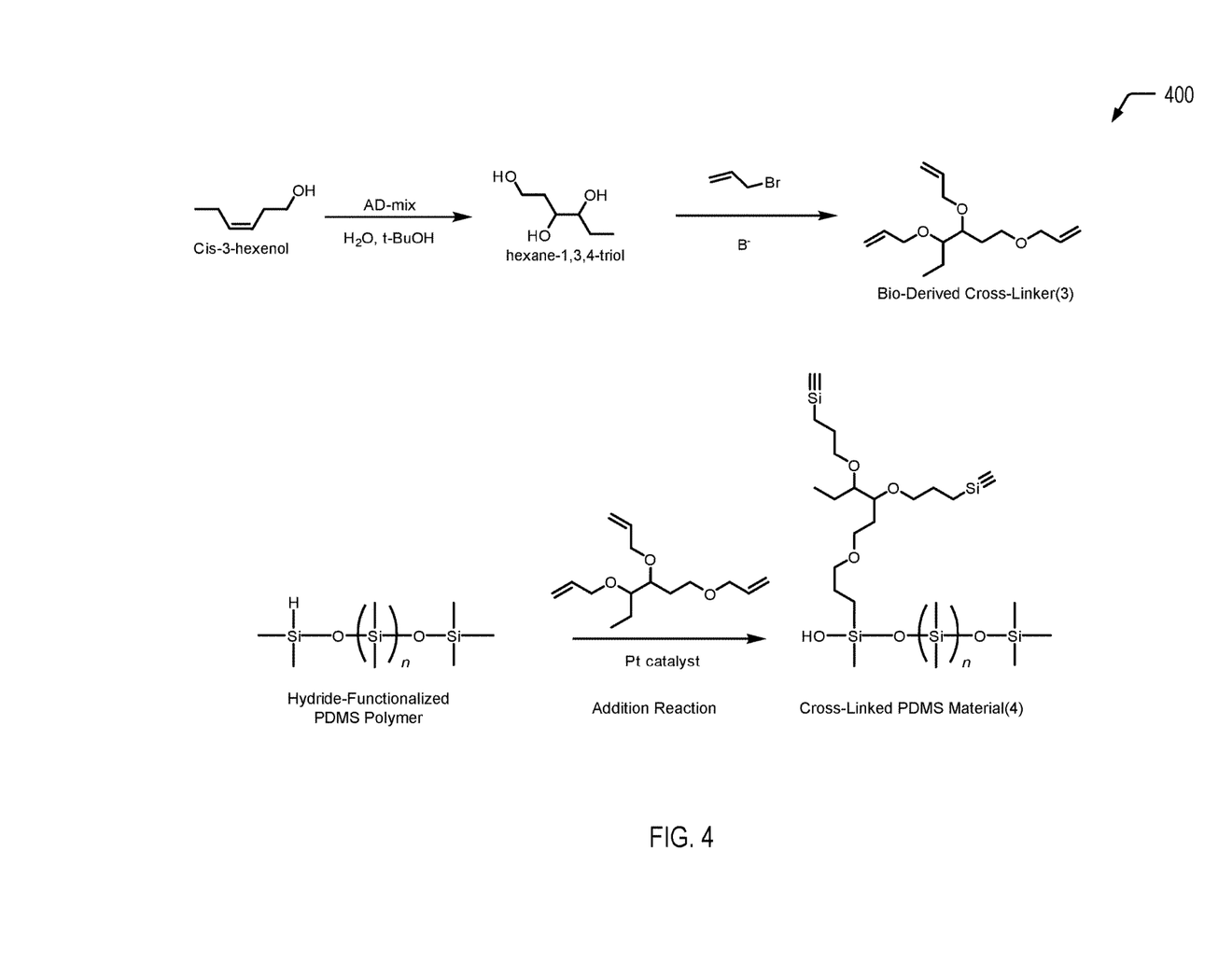
FIG. 4 is a chemical reaction diagram illustrating a process of forming a cross-linked PDMS material using a third bio-derived cross-linking material that is formed from the biorenewable molecule cis-3-hexenol, according to one embodiment.

Referring to FIG. 4, a chemical reaction diagram 400 illustrates a particular embodiment of a process of utilizing the bio-derived hexane-1,3,4-triol molecule to form a third bio-derived cross-linker (identified as "Bio-Derived Cross-Linker(3)" in FIG. 4) that includes multiple vinyl groups. FIG. 4 further illustrates that the third bio-derived cross-linker may be utilized to form a cross-linked polymeric material (e.g., a cross-linked PDMS material), according to one embodiment.

The first chemical reaction depicted at the top of FIG. 4 illustrates that the bio-derived hexane-1,3,4-triol molecule may be reacted with allyl bromide via a substitution reaction to form a cross-linker with multiple vinyl groups (that is different from the bio-derived cross-linker with multiple vinyl groups shown in FIG. 3). In some cases, the allyl bromide may be synthesized in one step from a biorenewable allyl alcohol.

As a prophetic example, cis-3-hexenol may be added to a suspension or solution of a base (e.g., sodium hydride) in an organic solvent, such as tetrahydrofuran (THF) or diethyl ether at 0° C. The reaction mixture may be stirred for 30 minutes before adding allyl bromide (>3 equiv.), dropwise. The reaction mixture may be stirred for approximately 3 hours, and then neutralized by hydrochloric (HCl) acid. The aqueous and organic layers may then be separated. The aqueous layer may be extracted with diethyl ether, and rinsed with brine. The organic layer may be dried over magnesium sulfate ($MgSO_4$), and the solvent may be removed in vacuo. The residue is purified by distillation or column chromatography The second chemical reaction depicted at the bottom of FIG. 4 illustrates that the third cross-linker may be utilized to form a cross-linked polymeric material. FIG. 4 illustrates a particular embodiment of an addition reaction that utilizes a platinum (Pt) catalyst. As a prophetic example, a hydride-functionalized siloxane may be blended with the third bio-derived cross-linker having multiple vinyl groups (1-20% w/w) and Pt catalyst, such as Speier's catalyst ($H_2PtCl_6$) or Karstedt's catalyst ($C_{24}H_{54}O3Pt_2Si_6$), and are then mixed. An addition cure reaction via hydrosilation may be performed on the mixture.

FIG. 4 depicts an example in which all three vinyl groups of the second bio-derived cross-linker react in the addition reaction. Depending on the reaction conditions, all three vinyl groups may be used to cross-link the PDMS polymer or less than three vinyl groups may be used for cross-linking. To illustrate, by controlling the reaction conditions, catalyst type (other tin or platinum catalyst may be used), catalyst loading, and stoichiometry, a fraction of the vinyl groups can be used for PDMS cross-linking. The ability to control the number of vinyl groups that react may enable better control of the mechanical properties of the final polymer.

Thus, FIG. 4 illustrates an example of a process of forming a bio-derived cross-linker having multiple vinyl groups from hexane-1,3,4-triol (derived from the biorenewable molecule cis-3-hexenol) and utilizing the bio-derived cross-linker to form a cross-linked polymeric material via an addition reaction. The bio-derived cross-linker may be used to increase the biorenewable content of a resulting cross-linked polymeric material (e.g., a cross-linked PDMS material).

Figure 5:
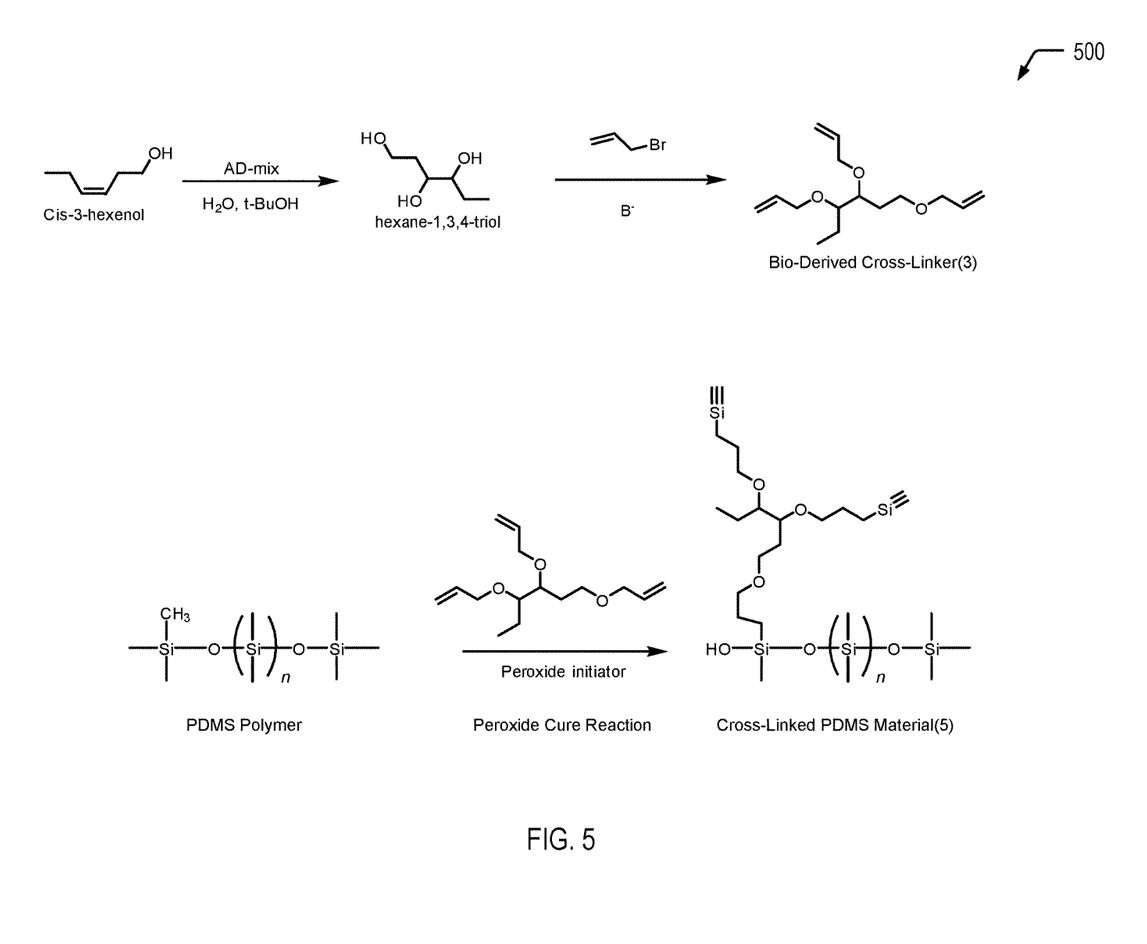
FIG. 5 is a chemical reaction diagram illustrating a process of forming a cross-linked PDMS material using the third bio-derived cross-linking material of FIG. 4, according to one embodiment.

Referring to FIG. 5, a chemical reaction diagram 500 illustrates a particular embodiment of a process of utilizing the third bio-derived cross-linker having multiple vinyl groups of FIG. 4 to form a cross-linked polymeric material (e.g., a cross-linked PDMS material) via a peroxide cure reaction.

The second chemical reaction depicted at the bottom of FIG. 5 illustrates that the third cross-linker may be utilized to form a cross-linked polymeric material via a radical cure reaction using a peroxide initiator. As a prophetic example, a Si—$CH_3$ functional siloxane may be blended with the third bio-derived cross-linker having multiple vinyl groups (1-20% w/w) and catalyst (e.g., benzoyl peroxide, 0.2%-1.0% w/w) and mixed. The mixture may be applied to molds or coated onto a substrate and cured for times and temperatures (e.g., 140-160° C., with a post cure of 25-30° C. higher than the initial reaction temperature to remove volatile peroxides) as appropriate for desired applications.

FIG. 5 depicts an example in which all three vinyl groups of the second bio-derived cross-linker react in the peroxide cure reaction. Depending on the reaction conditions, all three vinyl groups may be used to cross-link the PDMS polymer or less than three vinyl groups may be used for cross-linking. To illustrate, by controlling the reaction conditions, catalyst type, catalyst loading, and stoichiometry, a fraction of the vinyl groups can be used for PDMS cross-linking. The ability to control the number of vinyl groups that react may enable better control of the mechanical properties of the final polymer.

Thus, FIG. 5 illustrates an example of a process of forming a bio-derived cross-linker having multiple vinyl groups from hexane-1,3,4-triol (derived from the biorenewable molecule cis-3-hexenol) and utilizing the bio-derived cross-linker to form a cross-linked polymeric material via a peroxide cure reaction. The bio-derived cross-linker may be used to increase the biorenewable content of a resulting cross-linked polymeric material (e.g., a cross-linked PDMS material).

Figure 6:
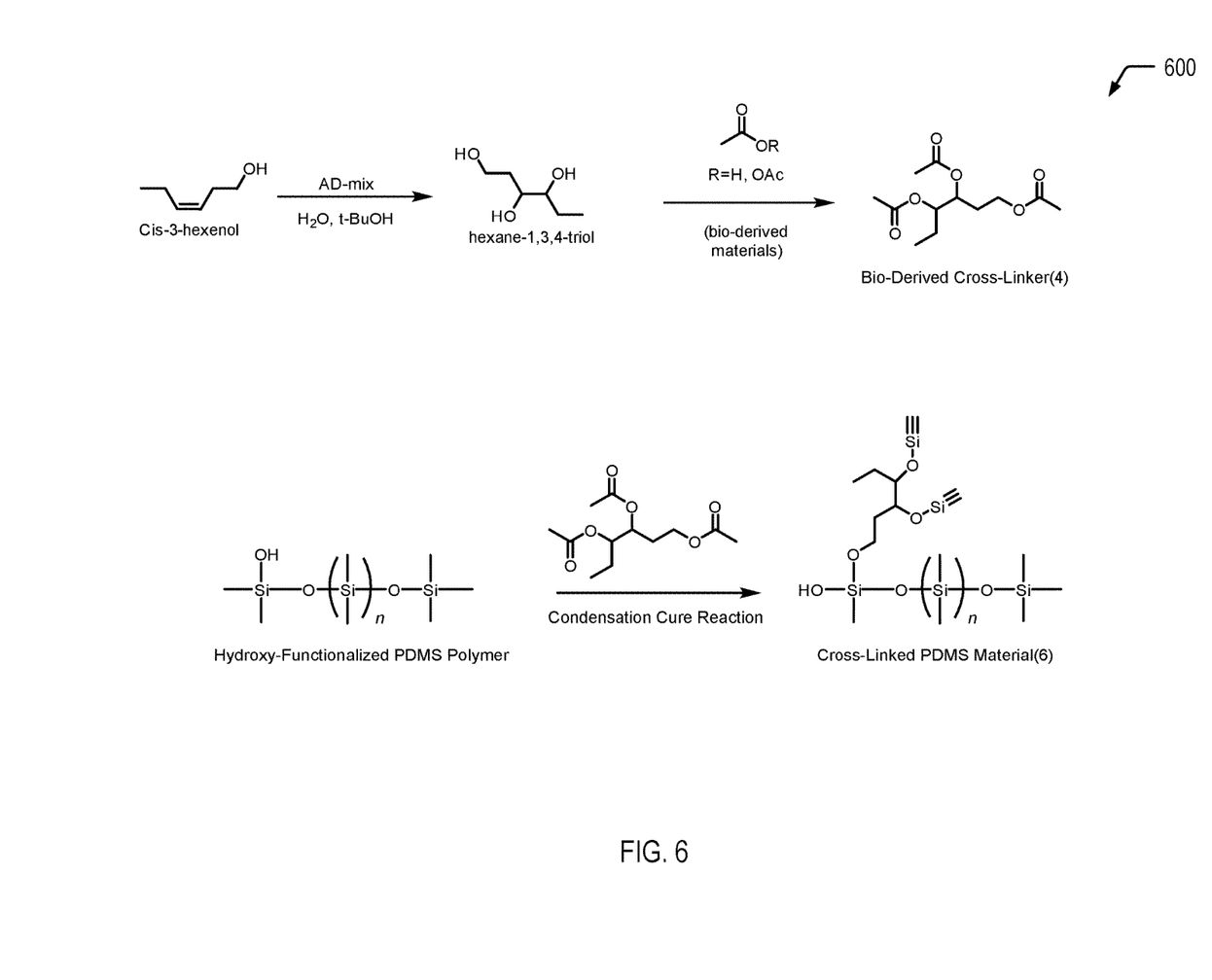
FIG. 6 is a chemical reaction diagram illustrating a process of forming a cross-linked PDMS material using a fourth bio-derived cross-linking material that is formed from the biorenewable molecule cis-3-hexenol, according to one embodiment.

Referring to FIG. 6, a chemical reaction diagram 600 illustrates a particular embodiment of a process of utilizing the bio-derived hexane-1,3,4-triol molecule to form a fourth bio-derived cross-linker (identified as "Bio-Derived Cross-Linker(4)" in FIG. 6) that includes multiple acetate groups.

FIG. 6 further illustrates that the bio-derived cross-linker may be utilized to form a cross-linked polymeric material (e.g., a cross-linked PDMS material), according to one embodiment.

The first chemical reaction depicted at the top of FIG. 6 illustrates that the bio-derived hexane-1,3,4-triol molecule may be reacted with acetic acid or acetic anhydride via an acylation reaction to form a cross-linker that includes multiple acetate groups. The acetic acid may be obtained from renewable sources, and acetic anhydride can be synthesized from acetic acid.

As a prophetic example, hexane-1,3,4-triol (1 equiv.), acetic acid or acetic anhydride (4.5-5.0 equiv.), catalytic p-toluenesulfonic acid (or other catalysts such as sulfonic acids, sulfuric acid, phosphoric acid, hydrogen sulfates, dihydrogen phosphates, phosphonic acid esters, or dialkyl tin dioxides) or a Lewis base such as dimethylaminopyridine (DMAP), and a suitable amount of toluene (or other water-azeotrope forming solvents) may be added to a reaction vessel and heated under azeotropic distillation conditions (e.g., refluxing using a Dean-Stark apparatus) until water is no longer removed from the reaction. The mixture may be cooled to room temperature, and the organic layer may be separated, rinsed with water, dried, and purified.

The second chemical reaction depicted at the bottom of FIG. 6 illustrates that the fourth bio-derived cross-linker having multiple acetate groups may be utilized to form a cross-linked polymeric material via a condensation cure reaction. As a prophetic example, a hydroxy-functionalized siloxane may be mixed with the fourth bio-derived cross-linker having multiple acetate groups (1-50% w/w) and blended with exclusion of moisture. The blended mixture may be stored under moisture-free conditions. The blended mixture may be applied to surfaces and materials and allowed to cure under atmospheric conditions.

FIG. 6 depicts an example in which all three acetate groups of the fourth bio-derived cross-linker react in the addition reaction. Depending on the reaction conditions, all three acetate groups may be used to cross-link the PDMS polymer or less than three acetate groups may be used for cross-linking. The ability to control the number of acetate groups that react may enable better control of the mechanical properties of the final polymer.

Thus, FIG. 6 illustrates an example of a process of forming a bio-derived cross-linker having multiple acetate groups from hexane-1,3,4-triol (derived from the biorenewable molecule cis-3-hexenol) and utilizing the bio-derived cross-linker to form a cross-linked polymeric material via a condensation cure reaction. The bio-derived cross-linker may be used to increase the biorenewable content of a resulting cross-linked polymeric material (e.g., a cross-linked PDMS material).

Figure 7:
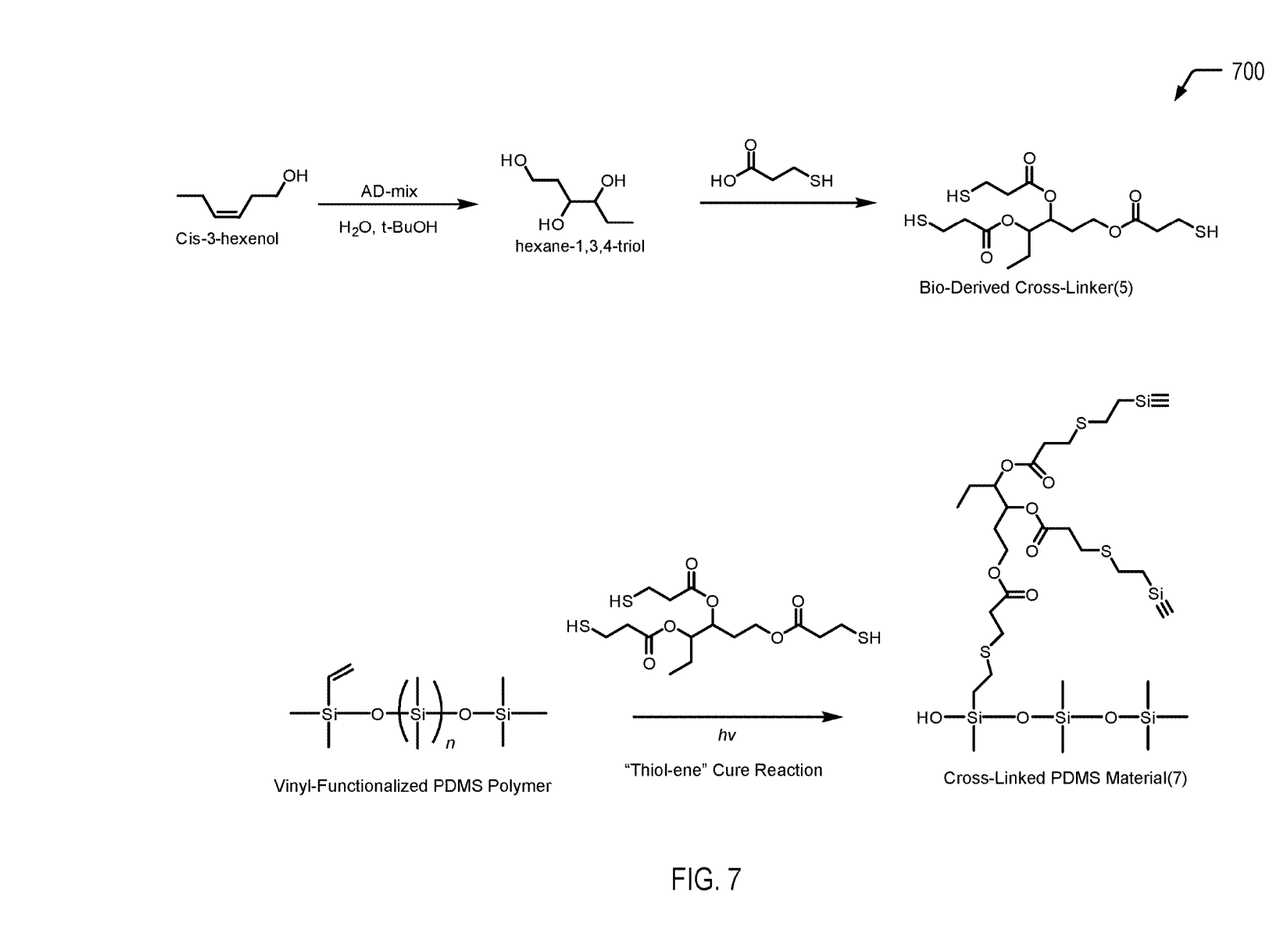
FIG. 7 is a chemical reaction diagram illustrating a process of forming a cross-linked PDMS material using a fifth bio-derived cross-linking material that is formed from the biorenewable molecule cis-3-hexenol, according to one embodiment.

Referring to FIG. 7, a chemical reaction diagram 700 illustrates a particular embodiment of a process of utilizing the bio-derived hexane-1,3,4-triol molecule to form a fifth bio-derived cross-linker (identified as "Bio-Derived Cross-Linker(5)" in FIG. 7) that includes multiple thiol (or mercapto) groups. FIG. 7 further illustrates that the bio-derived cross-linker may be utilized to form a cross-linked polymeric material (e.g., a cross-linked PDMS material), according to one embodiment.

The first chemical reaction depicted at the top of FIG. 7 illustrates that the bio-derived hexane-1,3,4-triol molecule may be reacted with ethyl mercaptoacetic acid via a condensation reaction (acid/base promoted) to synthesize a cross-linker with multiple thiol (or mercpato) groups. The ethyl mercaptoacetic acid may be synthesized from biorenewable acrylic acid via subsequent halogenation and substitution reactions.

As a prophetic example, hexane-1,3,4-triol (1 equiv.), 3-mercaptopropionic acid (4.5-5.0 equiv.), catalytic p-toluenesulfonic acid (or other catalysts such as sulfonic acids, triflic acid, sulfuric acid, phosphoric acid, hydrogen sulfates, dihydrogen phosphates, phosphonic acid esters, or dialkyl tin dioxides) or a Lewis base such as dimethylaminopyridine (DMAP), 1,8-Diazabicyclo[5.4.0]undec-7-ene (DBU), or triphenylphosphine, and a suitable amount of toluene (or other water-azeotrope forming solvents) may be added to a reaction vessel and heated under azeotropic distillation conditions (e.g., refluxing using a Dean-Stark apparatus) until water is no longer removed from the reaction. The mixture may be cooled to room temperature, and the organic layer may be separated, rinsed with water, dried, and purified.

The second chemical reaction depicted at the bottom of FIG. 7 illustrates that the fifth bio-derived cross-linker may be utilized to form a cross-linked polymeric material via a thiol-ene cure reaction. As a prophetic example, the fifth bio-derived cross-linker having multiple thiol groups (2-6% w/w) may be mixed with a vinyl-functionalized siloxane. The mixture may include a radical initiator, such as a Micheler's ketone, an alpha-amino-ketone, an alpha-hydroxy-ketone, a benzyldimethyl ketal, or benzophenone (among other alternatives). The mixture may be applied to molds or coated onto a substrate and cured under UV light at a time and temperature suitable to the included radical initiators as appropriate for desired applications.

FIG. 7 depicts an example in which all three thiol groups of the fifth bio-derived cross-linker react in the thiol-ene cure reaction. Depending on the reaction conditions, all three thiol groups may be used to cross-link the PDMS polymer or less than three thiol groups may be used for cross-linking. The ability to control the number of thiol groups that react may enable better control of the mechanical properties of the final polymer.

Thus, FIG. 7 illustrates an example of a process of forming a bio-derived cross-linker having multiple thiol (or mercapto) groups from hexane-1,3,4-triol (derived from the biorenewable molecule cis-3-hexenol) and utilizing the bio-derived cross-linker to form a cross-linked polymeric material via a thiol-ene cure reaction. The bio-derived cross-linker may be used to increase the biorenewable content of a resulting cross-linked polymeric material (e.g., a cross-linked PDMS material).

Figure 8:
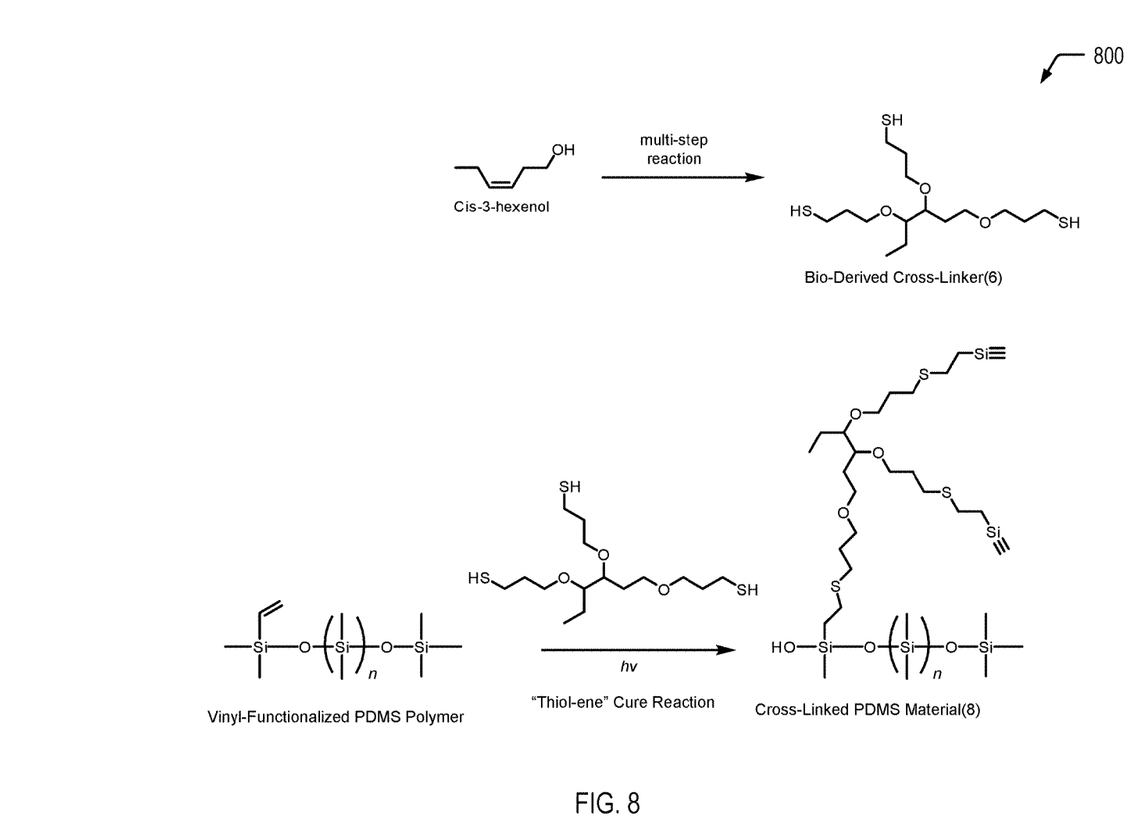
FIG. 8 is a chemical reaction diagram illustrating a process of forming a cross-linked PDMS material using a sixth bio-derived cross-linking material that is formed from the biorenewable molecule cis-3-hexenol, according to one embodiment.
Figure 9:
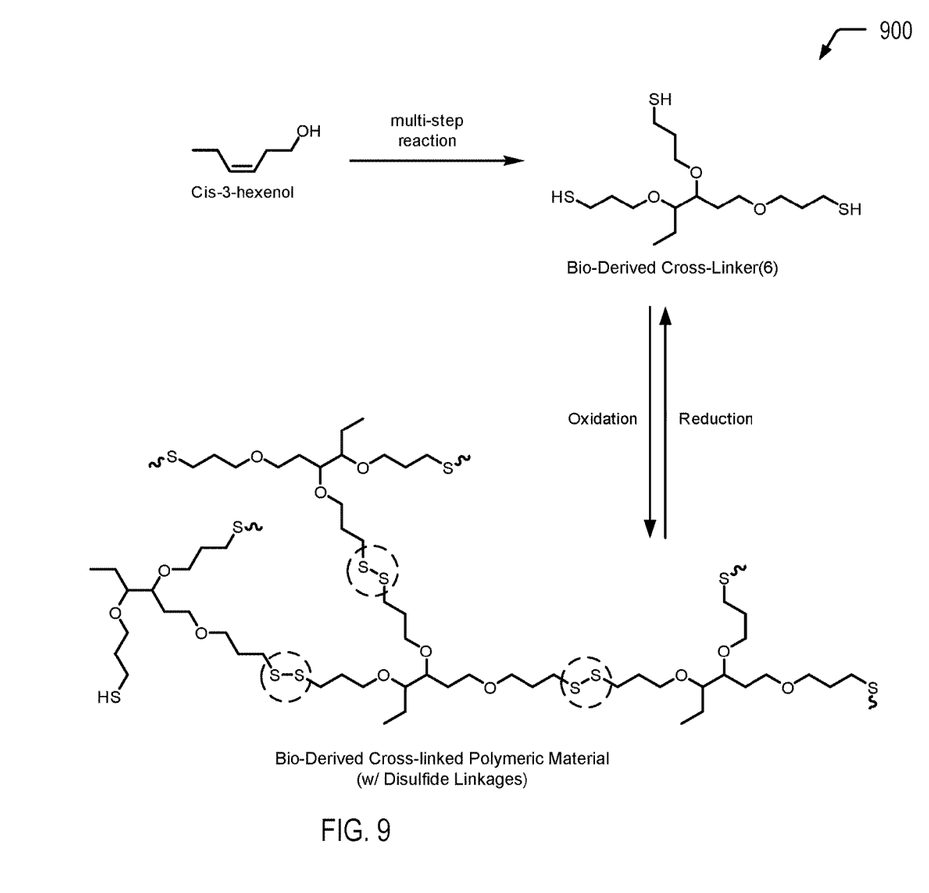
FIG. 9 is a chemical reaction diagram illustrating a process of forming a bio-derived cross-linked polymeric material from the sixth bio-derived cross-linking material of FIG. 8, according to one embodiment.

Referring to FIG. 8, a chemical reaction diagram 800 illustrates a particular embodiment of a process of utilizing the biorenewable cis-3-hexenol molecule to form a sixth bio-derived cross-linker (identified as "Bio-Derived Cross-Linker(5)" in FIG. 8) that includes multiple thiol (or mercapto) groups. FIG. 8 further illustrates that the bio-derived cross-linker may be utilized to form a cross-linked polymeric material (e.g., a cross-linked PDMS material), according to one embodiment.

The first chemical reaction depicted at the top of FIG. 8 illustrates that the biorenewable cis-3-hexenol molecule may be utilized to form a cross-linker with multiple thiol (or mercapto) groups via a multiple step reaction that includes the use of an acetate protected thiol bromopropane (commercially available) and substitution chemistry, then removing the protecting group. As a prophetic example, cis-3-hexenol may be added to a suspension or solution of a base (e.g., sodium hydride) in an organic solvent, such as tetrahydrofuran (THF), diethyl ether, or N,N-dimethylformamide (DMF) at 0° C. The reaction mixture may be stirred for 30 minutes before adding S-(3-bromopropyl)ethanethioic acid ester (>3 equiv.), dropwise. The reaction mixture may be stirred for approximately 3 hours, and then neutralized by hydrochloric (HCl) acid. The aqueous and organic layers may then be separated. The aqueous layer may be extracted with diethyl ether, and rinsed with brine. The organic layer may be dried over magnesium sulfate (MgSO$_4$), and the solvent may be removed in vacuo. The residue may be purified by distillation or column chromatography. The resultant product may be dissolved in DCM at 0° C. and an acid such as trifluoroacetic acid may be added, dropwise. The reaction may be stirred for 3 hours at room temperature, and poured into water. The aqueous and organic layers may then be separated. The aqueous layer may then be extracted with diethyl ether, and rinsed with brine. The organic layer may be dried over magnesium sulfate (MgSO$_4$), and the solvent may be removed in vacuo. The residue is purified by distillation or column chromatography.

The second chemical reaction depicted at the bottom of FIG. 8 illustrates that the sixth bio-derived cross-linker may be utilized to form a cross-linked polymeric material via a thiol-ene cure reaction. As a prophetic example, the sixth bio-derived cross-linker having multiple thiol groups (2-6% w/w) may be mixed with a vinyl-functionalized siloxane. The mixture may include a radical initiator, such as a Micheler's ketone, an alpha-amino-ketone, an alpha-hydroxy-ketone, a benzyldimethyl ketal, or benzophenone (among other alternatives). The mixture may be applied to molds or coated onto a substrate and cured under UV light at a time and temperature suitable to the included radical initiators as appropriate for desired applications.

FIG. 8 depicts an example in which all three thiol groups of the sixth bio-derived cross-linker react in the thiol-ene cure reaction. Depending on the reaction conditions, all three thiol groups may be used to cross-link the PDMS polymer or less than three thiol groups may be used for cross-linking. The ability to control the number of thiol groups that react may enable better control of the mechanical properties of the final polymer.

Thus, FIG. 8 illustrates an example of a process of forming a bio-derived cross-linker having multiple thiol (or mercapto) groups from the biorenewable molecule cis-3-hexenol and utilizing the bio-derived cross-linker to form a cross-linked polymeric material via a thiol-ene cure reaction. The bio-derived cross-linker may be used to increase the biorenewable content of a resulting cross-linked polymeric material (e.g., a cross-linked PDMS material).

Referring to FIG. 9, a chemical reaction diagram 900 illustrates that the bio-derived cross-linkers having multiple thiol (or mercapto) groups may be joined together to form a polymeric network of disulfide bonds, according to one embodiment. In the example depicted in FIG. 9, the bio-derived cross-linker of FIG. 8 may undergo an oxidation-reduction reaction to form multiple disulfide linkages. While FIG. 9 illustrates an example in which the bio-derived cross-linker corresponds to the example cross-linker depicted in FIG. 8, it will be appreciated that the bio-derived cross-linker of FIG. 7 that includes multiple thiol (or mercapto) groups may also undergo a similar oxidation-reduction reaction to form a polymeric network of disulfide linkages.

Figure 10:
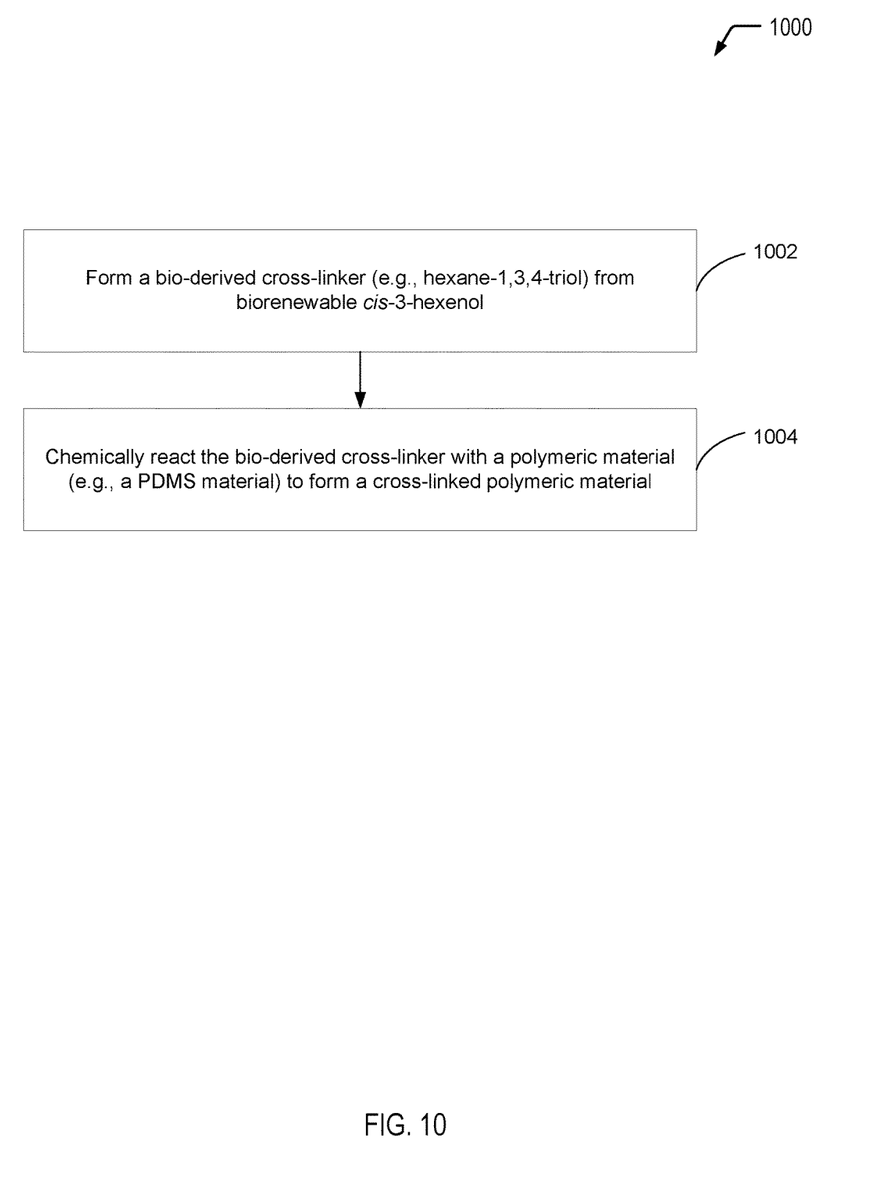
FIG. 10 is a flow diagram showing a particular embodiment of a process of forming a bio-derived cross-linker from the biorenewable molecule cis-3-hexenol.

Referring to FIG. 10, a flow diagram illustrates an example of a process 1000 of forming a bio-derived cross-linker from biorenewable cis-3-hexenol (natural leaf alcohol), according to one embodiment. In the particular embodiment depicted in FIG. 10, the process 1000 also includes utilizing the bio-derived cross-linker to form a cross-linked polymeric material.

The process 1000 includes forming a bio-derived cross-linker (e.g., hexane-1,3,4-triol) by from biorenewable cis-3-hexenol, at 1002. For example, biorenewable cis-3-hexenol may be converted to hexane-1,3,4-triol according to the process described herein with respect to FIG. 1 (e.g., via Sharpless Asymmetric Dihydroxylation). As another example, biorenewable cis-3-hexenol may be converted to the sixth bio-derived cross-linker according to the process described herein with respect to FIG. 8 (e.g., via a multi-step reaction).

In the particular embodiment depicted in FIG. 10, the process 1000 also includes chemically reacting the bio-derived cross-linker with a polymeric material to form a cross-linked polymeric material, at 1004. For example, referring to FIG. 1, the first cross-linked PDMS material may be formed from a hydride-functionalized siloxane and the bio-derived hexane-1,3,4-triol via a condensation cure reaction. As another example, referring to FIG. 2, the second cross-linked PDMS material may be formed from an alkoxy-functionalized (e.g., methoxy-functionalized) siloxane and the bio-derived hexane-1,3,4-triol via a condensation cure reaction. As yet another example, referring to FIG. 8, the eighth cross-linked PDMS material may be formed from a vinyl-functionalized siloxane and the sixth bio-derived cross-linker via a thiol-ene cure reaction.

Thus, FIG. 10 illustrates an example of a process of forming a bio-derived cross-linker (e.g., hexane-1,3,4-triol) from biorenewable cis-3-hexenol (natural leaf alcohol) and utilizing the bio-derived cross-linker to form a cross-linked polymeric material (e.g., a cross-linked PDMS material).

Figure 11:
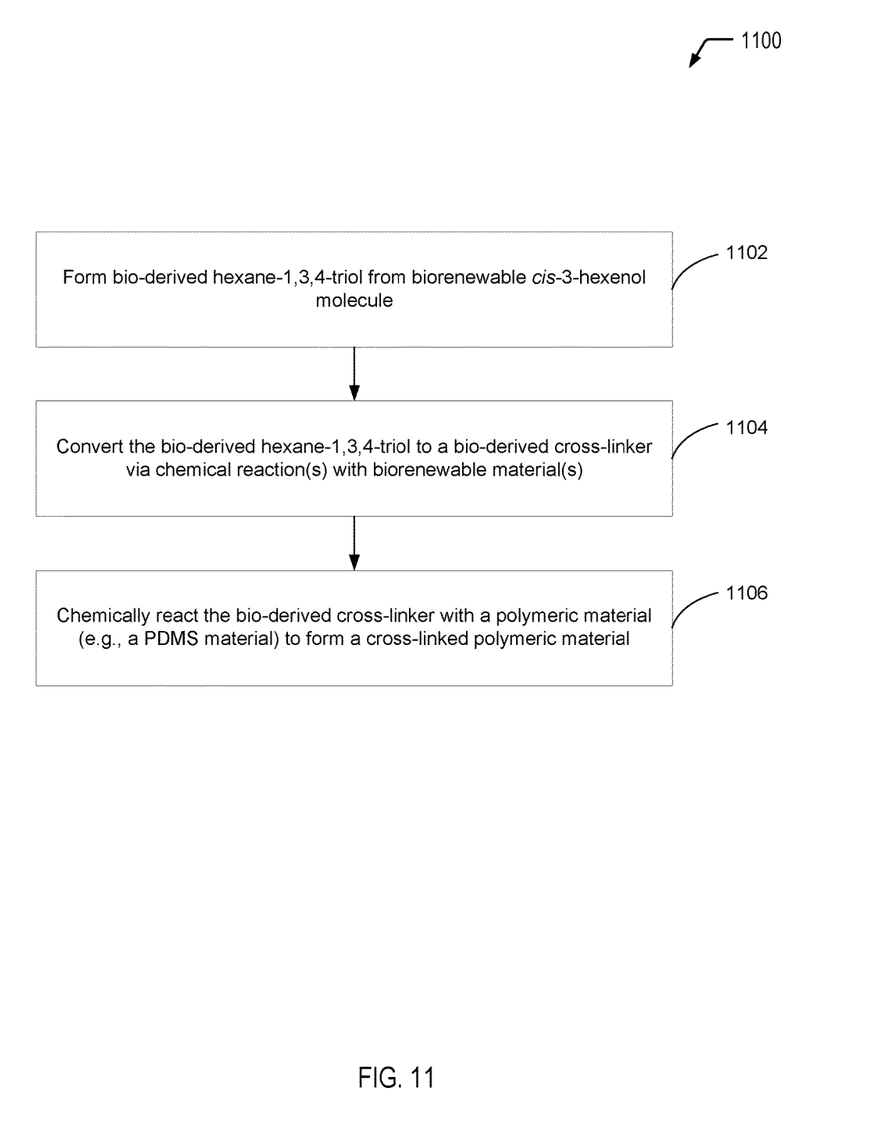
FIG. 11 is a flow diagram showing a particular embodiment of a process of utilizing a bio-derived cross-linker that is formed from the biorenewable molecule cis-3-hexenol to form a cross-linked polymeric material.

Referring to FIG. 11, a flow diagram illustrates an example of a process of forming a bio-derived cross-linker from biorenewable cis-3-hexenol (natural leaf alcohol), according to one embodiment. In FIG. 11, the bio-derived hexane-1,3,4-triol molecule is formed from biorenewable cis-3-hexenol and is subsequently chemically reacted with one or more other biorenewable materials to form bio-derived cross-linkers with different functional groups. In the particular embodiment depicted in FIG. 11, the process 1100 also includes utilizing the bio-derived cross-linker to form a cross-linked polymeric material.

The process 1100 includes forming bio-derived hexane-1,3,4-triol from bio-derived cis-3-hexenol, at 1102. For example, biorenewable cis-3-hexenol may be converted to hexane-1,3,4-triol according to the process described herein with respect to FIG. 1 (e.g., via Sharpless Asymmetric Dihydroxylation).

The process 1100 also includes converting the bio-derived hexane-1,3,4-triol to a bio-derived cross-linker via one or more chemical reactions with one or more biorenewable materials, at 1104. For example, referring to FIG. 3, the bio-derived hexane-1,3,4-triol may be utilized to form a bio-derived cross-linker having multiple acrylate groups. As another example, referring to FIGS. 4 and 5, the bio-derived hexane-1,3,4-triol may be utilized to form bio-derived cross-linkers having multiple vinyl groups. As another example, referring to FIG. 6, the bio-derived hexane-1,3,4-triol may be utilized to form a bio-derived cross-linker having multiple acetate groups. As yet another example, referring to FIG. 7, the bio-derived hexane-1,3,4-triol may be utilized to form bio-derived cross-linkers having multiple thiol (or mercapto) groups.

The process 1100 further includes chemically reacting the bio-derived cross-linker with a polymeric material to form a cross-linked polymeric material, at 1106. For example, referring to FIG. 3, the third cross-linked PDMS material may be formed from a hydride-functionalized siloxane and the second bio-derived cross-linker (having multiple acrylate groups) via an addition reaction. As another example, referring to FIGS. 4 and 5, the third bio-derived cross-linker (having multiple vinyl groups) may be used to form a cross-linked PDMS material via a peroxide cure reaction or via a condensation cure reaction. As a further example, referring to FIG. 6, the sixth cross-linked PDMS material may be formed from a hydroxy-functionalized siloxane and the fourth bio-derived cross-linker (having multiple acetate groups) via a condensation cure reaction. As yet another example, referring to FIGS. 7 and 8, the fifth and sixth bio-derived cross-linkers (having multiple thiol/mercapto) groups may be used to form a cross-linked PDMS material via a thiol-ene cure reaction.

Thus, FIG. 11 illustrates an example of a process of forming hexane-1,3,4-triol from biorenewable cis-3-hexenol (natural leaf alcohol), utilizing the bio-derived hexane-1,3,4-triol to form a bio-derived cross-linker with alternative functional groups, and utilizing the bio-derived cross-linker to form a cross-linked polymeric material (e.g., a cross-linked PDMS material).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a cross-linked polymeric material, the process comprising:
   utilizing biorenewable cis-3-hexenol to form a bio-derived cross-linker; and
   utilizing the bio-derived cross-linker to form a cross-linked polydimethylsiloxane (PDMS) material.

2. The process of claim 1, wherein the bio-derived cross-linker includes hexane-1,3,4-triol.

3. The process of claim 2, wherein the cross-linked PDMS material is formed via a chemical reaction of a functionalized PDMS material and hexane-1,3,4-triol.

4. The process of claim 3, wherein the functionalized PDMS material includes a hydride-functionalized PDMS material, and wherein the chemical reaction includes a condensation cure reaction using dibutyltin dilaurate (DBDTL) as a catalyst.

5. The process of claim 3, the functionalized PDMS material includes an alkoxy-functionalized PDMS material, and wherein the chemical reaction includes a condensation cure reaction using dibutyltin dilaurate (DBDTL) as a catalyst.

6. The process of claim 5, wherein the alkoxy-functionalized PDMS material includes a methoxy-functionalized PDMS material.

7. The process of claim 1, wherein utilizing biorenewable cis-3-hexenol to form the bio-derived cross-linker includes:
   forming hexane-1,3,4-triol from the biorenewable cis-3-hexenol; and
   forming the bio-derived cross-linker from the hexane-1,3,4-triol.

8. The process of claim 7, wherein the bio-derived cross-linker includes multiple acrylate groups.

9. The process of claim 7, wherein the bio-derived cross-linker includes multiple vinyl groups.

10. The process of claim 7, wherein the bio-derived cross-linker includes multiple acetate groups.

11. The process of claim 7, wherein the bio-derived cross-linker includes multiple thiol groups.

12. A cross-linked polydimethylsiloxane (PDMS) material formed by a process that comprises chemically reacting a functionalized PDMS material with a bio-derived cross-linker that is derived from biorenewable cis-3-hexenol.

13. The cross-linked PDMS material of claim 12, wherein the bio-derived cross-linker includes hexane-1,3,4-triol or is formed from hexane-1,3,4-triol.

14. The cross-linked PDMS material of claim 12, wherein the functionalized PDMS material includes a hydride-functionalized PDMS material, an alkoxy-functionalized PDMS material, a hydroxy-functionalized PDMS material, or a vinyl-functionalized PDMS material.

15. A process of forming a bio-derived cross-linker, the process comprising:
   initiating a first chemical reaction to form hexane-1,3,4-triol from biorenewable cis-3-hexenol; and
   initiating a second chemical reaction to form a bio-derived cross-linker from the hexane-1,3,4-triol.

16. The process of claim 15, wherein the bio-derived cross-linker includes multiple acrylate groups.

17. The process of claim 15, wherein the bio-derived cross-linker includes multiple vinyl groups.

18. The process of claim 15, wherein the bio-derived cross-linker includes multiple acetate groups.

19. The process of claim 15, wherein the bio-derived cross-linker includes multiple thiol groups.

20. The process of claim 15, wherein the bio-derived cross-linker undergoes an oxidation-reduction reaction to form a polymeric network of disulfide linkages.

* * * * *